United States Patent
Koch et al.

(10) Patent No.: US 6,255,451 B1
(45) Date of Patent: Jul. 3, 2001

(54) DEGRADATION OF BIOLOGICALLY DEGRADABLE POLYMERS USING ENZYMES

(75) Inventors: Rainhard Koch, Köln (DE); Henrik Lund, Kopenhagen (DK)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/403,676

(22) PCT Filed: Feb. 4, 1998

(86) PCT No.: PCT/EP98/00585

§ 371 Date: Aug. 10, 1999

§ 102(e) Date: Aug. 10, 1999

(87) PCT Pub. No.: WO98/36086

PCT Pub. Date: Aug. 20, 1998

(30) Foreign Application Priority Data

Feb. 17, 1997 (DE) .............................................. 197 06 023

(51) Int. Cl.$^7$ ....................................................... C08F 6/06
(52) U.S. Cl. .............................. 528/490; 435/18; 435/19; 435/29; 435/252.1; 435/254.1; 435/255.1; 435/262
(58) Field of Search ............................. 528/490; 435/18, 435/19, 29, 252.1, 254.1, 255.1, 262

(56) References Cited

U.S. PATENT DOCUMENTS

| | | | |
|---|---|---|---|
| 4,343,931 | 8/1982 | Barrows | 528/291 |
| 4,529,792 | 7/1985 | Barrows | 528/291 |
| 5,273,898 | 12/1993 | Ishii | 435/198 |
| 5,644,020 | 7/1997 | Timmermann et al. | 528/288 |
| 5,961,906 | 10/1999 | Muller et al. | 264/109 |
| 6,071,711 * | 6/2000 | Koch | 435/18 |

FOREIGN PATENT DOCUMENTS

| | | |
|---|---|---|
| 54-119593 | 9/1979 | (JP) . |
| 54-119594 | 9/1979 | (JP) . |
| 56-22324 | 3/1981 | (JP) . |
| 6-322263 | 11/1994 | (JP) . |

OTHER PUBLICATIONS

A.M.C. Symposium 433 (Month Unavailable) 1990, pp. 136–148, Tokiwa, et al "Biodegradation of Synthetic Polymers Containing Ester Bonds" (No Month).

Polymer Degradation and Stability, 36, (Month Unavailable) 1992, pp. 241–248, Kumagai et al "Enzymatic Degradation and Morphologies of Binary Blends of Microbial Poly(3–hydroxy butyrate) With Poly($\epsilon$–caprolactone), Poly(1,4–butylene Adipate and Poly(vinyl acetate)" (No Month).

J. Appl. Polym. Sci, (Month Unavailable) 1979, pp. 1701–1711, "Detection of Colloidal Particles" (No Month).

ASM General Meeting (Month Unavailable) 1996, G. T. Howard and R. C. Blake, Abstract p. 430, "Biodegradation and Bioremediation" (No Month).

* cited by examiner

Primary Examiner—Duc Truong
(74) Attorney, Agent, or Firm—Joseph C. Gil; Aron Preis

(57) ABSTRACT

This invention relates to the complete degradation by enzymes of moldings, sheet-like products, coatings, adhesives or foams made of biodegradable polymers. The invention relates in particular to the enzymatic degradation of polyester amides, and of polyester urethanes which contain urea groups.

7 Claims, No Drawings

DEGRADATION OF BIOLOGICALLY DEGRADABLE POLYMERS USING ENZYMES

This invention relates to the complete degradation by enzymes of mouldings, sheet-like products, coatings, adhesives or foams made of biodegradable polymers. The invention relates in particular to the enzymatic degradation of polyester amides, and of polyester urethanes which contain urea groups.

Materials which are completely biodegradable and compostable are becoming increasingly important. In recent years, a multiplicity of polymers of this type has been developed with the aim of providing a plastics material which can be utilised by composting. At the same time, various regulations and standards have been issued which regulate the use of materials of this type for composting (LAGA leaflet M 10) or which are capable of detecting that materials can be composted harmlessly (DIN 54900). In this connection, the expression "biological degradation" is always understood to mean that, in the presence of microorganisms, materials which are thus described are completely metabolised by the latter to form $CO_2$ and biomass.

It is known that the degradability of some plastics can be detected not only by the growth of microorganisms on the polymer, but can also be detected with the aid of enzymes. In the latter procedure, the test material is incubated with suitable enzymes and the products of degradation are analysed (Jap. Pat. 56022324, Jap. Pat. 06322263, Polymer Degradation and Stability, 1992, pages 241–248). In the context of basic research, other authors have made use of enzymatic degradability in order to detect a capacity for biodegradation in principle (Y. Tokiwa et al. in: J. E. Glass (Editor) ACS Symposium Series 433, 1990, pages 136–148). In this cited article it is expressly mentioned that the complete degradation of the polymer was not investigated. What is supposedly the complete degradation of a polymer has been reported (FR 93-6070). However, for the polypropylene fumarate which was used in the latter document it was only the cleavage of the ester bonds which was achieved. Polypropylene, which is not biodegradable, as is known, remained behind. In all the cases which were known hitherto, enzymatic polymer degradation has proceeded either to a very slight extent only, or very slowly. There is no mention of a targeted selection of enzymes which degrade the polymers investigated particularly efficiently and rapidly. Likewise, there is no mention of any applications, which can possibly be modified for commercial use, of the complete degradation of polymers by means of enzymes.

It is generally known that polyester amides can undergo biodegradation (J. Appl. Polym. Sci., 1979, pages 1701–1711, U.S. Pat. No. 4,343,931, U.S. Pat. No. 4,529, 792, Jap. Pat. 79119593, Jap. Pat. 79119594, EP-A 641817).

It is also known that polyester urethanes which contain urea groups can be completely biodegradable. The rate and extent of degradation depend on the monomer composition (DE-A 195 17 185). Enzymatic attack by a proteolytic enzyme on individual bonds in polymers such as these has been described (G. T. Howard, R. C. Blake, ASM General Meeting 1996, Abstracts page 430). The complete degradation of a film or sheet, or of a moulding, is not described.

It has been found that mouldings of biodegradable polymers can be completely degraded by means of defined enzymes or mixtures of these defined enzymes, optionally with other enzymes. It has also been found that selected enzymes are capable of completely degrading polymers of this type within timescales which can be employed commercially. In the course of this degradation procedure, the molecular weight of the polymer is reduced to such an extent that products formed therefrom are rapidly degraded to form monomers and are completely decomposed. This applies in particular to films, sheet-like products, coatings, adhesives, injection-molded parts and granular materials made of biodegradable polymers.

The periods of time which are necessary for the complete decomposition of the polymer are extraordinarily short. Rapid, complete degradation is only achieved, however, if a special combination of polymer and enzyme is selected. The effect which has been discovered here thus differs significantly from the work on the enzymatic degradation of biodegradable polymers which was known hitherto.

The present invention relates to a method for the enzymatic degradation of biodegradable polymers, particularly of polyester amides and of polyester urethanes which contain urea groups, wherein the biodegradable polymers are treated with an aqueous solution which can be buffered and which contains one or more lipases or cutinases selected from the group comprising the lipase from *Candida antarctica*, particularly component B, the lipase from *Mucor Miehei* (e.g. Lipozyme 20,000 L), the lipase from *Aspergillus niger* and the cutinase from Humicola insolens or one or more of said lipases and cutinases in combination with other enzymes.

Suitable biodegradable and compostable polymers include aliphatic or partially aromatic polyesters, thermoplastic aliphatic or partially aromatic polyester urethanes which may also contain urea groups, aliphatic-aromatic polyester carbonates and aliphatic or partially aromatic polyester amides. Polyester amides, and polyester urethanes which contain urea groups, are preferred.

The following polymers are suitable:

Aliphatic or partially aromatic polyesters formed from

A) linear bifunctional alcohols, preferably $C_2$–$C_{12}$ alkyl diols, such as ethanediol, butanediol or hexanediol for example, preferably butanediol, and/or optionally from cycloaliphatic bifunctional alcohols such cyclohexanedimethanol for example, and/or optionally from small amounts of branched bifunctional alcohols, preferably $C_3$–$C_{12}$ alkyl diols such as neopentyl glycol, and optionally from small amounts of alcohols of higher functionality in addition, preferably $C_3$–$C_{12}$ alkyl polyols, such as 1,2,3-propanetriol or trimethylolpropane for example, and from aliphatic bifunctional acids, preferably $C_2$–$C_{12}$ alkyl dicarboxylic acids, such as, for example and preferably, succinic acid or adipic acid, and/or optionally from aromatic bifunctional acids such as terephthalic acid or isophthalic acid or naphthalene dicarboxylic acid and optionally from small amounts of acids of higher functionality in addition, such as trimellitic acid for example, or B) those formed from acid- and alcohol-functionalised components, preferably components containing 2 to 12 C atoms in their alkyl chain, for example hydroxybutyric acid or hydroxyvaleric acid or lactic acid, or derivatives thereof, for example ε-caprolactone or dilactide, or a mixture or a copolymer of A and B, wherein the content of aromatic acids is not more than 50% by weight with respect to all the acids.

The acids may also be used in the form of derivatives, such as acid chlorides or esters for example;

aliphatic or partially aromatic polyester urethanes, which may also contain urea groups, and which comprise C) an ester constituent formed from bifunctional alcohols, preferably $C_2$–$C_{12}$ alkyl diols such as ethanediol, butanediol or hexanediol for example, preferably butanediol, and/or from cycloaliphatic bifunctional or polycyclic aliphatic alcohols, such as cyclohexanedimethanol for example, and/or optionally from smaller amounts of branched bifunctional alcohols, preferably $C_3$–$C_{12}$ alkyl diols, such as neopentyl glycol for example, and optionally from small amounts of alcohols of higher functionality in addition, preferably $C_3$–$C_{12}$ alkyl polyols, such as 1,2,3-propanetriol or trimethylolpropane for example, and from aliphatic bifunctional acids, preferably $C_2$–$C_{12}$ alkyldicarboxylic acids, such as, for example and preferably, succinic acid or adipic acid, and/or optionally from aromatic bifunctional acids such as terephthalic acid or isophthalic acid or naphthalene dicarboxylic acid and optionally from small amounts of acids of higher functionality in addition, such as trimellitic acid for example, or D) those formed from acid- and alcohol-functionalised components, preferably components containing 2 to 12 C atoms in their alkyl chain, for example hydroxybutyric acid or hydroxyvaleric acid or lactic acid, or derivatives thereof, for example ε-caprolactone or dilactide, or a mixture or a copolymer of A and B, and E) comprising the reaction product of C and/or D with aliphatic and/or cycloaliphatic bifunctional isocyanates and optionally with isocyanates of higher functionality in addition, preferably with those containing 1 to 12 C atoms or 5 to 8 C atoms in the case of cycloaliphatic isocyanates, e.g. tetramethylene diisocyanate, hexamethylene diisocyanate or isophorone diisocyanate, and optionally in addition with linear and/or branched and/or cycloaliphatic bifunctional alcohols and/or alcohols of higher functionality, preferably $C_3$–$C_{12}$ alkyl polyols or alcohols containing 5–8 C atoms in the case of cycloaliphatic alcohols, e.g. ethanediol, hexanediol, butanediol, cyclohexanedimethanol, and/or optionally in addition with linear and/or branched and/or cycloaliphatic bifunctional and/or dialkylamines or amino alcohols or dialkylamines or amino alcohols of higher functionality, preferably those containing 2 to 12 C atoms in their alkyl chain, such as ethylenediamine or aminoethanol, for example, and/or optionally with other modified amines or alcohols, such as ethylenediamine-ethanesulphonic acid for example, as the free acid or salt, wherein the content of esters C) and/or D) is at least 75% by weight with respect to the sum of C), D) and E);

aliphatic-aromatic polyester carbonates comprising

F) an ester constituent formed from linear bifunctional alcohols, preferably $C_2$–$C_{12}$ alkyl diols such as ethanediol, butanediol or hexanediol for example, preferably butanediol, and/or from cycloaliphatic bifunctional or polycyclic aliphatic alcohols, such as cyclohexanedimethanol for example, and/or optionally from small amounts of branched bifunctional alcohols, preferably those containing 3 to 12 C atoms in their alkyl chain, such as neopentyl glycol for example, and optionally from small amounts of alcohols of higher functionality in addition, preferably those containing 3 to 12 C atoms in their alkyl chain, such as 1,2,3-propanetriol or trimethylolpropane for example, and from linear and/or cycloaliphatic bifunctional acids and from small amounts of acids of higher functionality in addition, preferably those containing 3 to 12 C atoms in their alkyl chain, preferably adipic acid, or G) those formed from acid- and alcohol-functionalised components, preferably components containing 2 to 12 C atoms in their alkyl chain, for example hydroxybutyric acid or hydroxyvaleric acid or lactic acid, or derivatives thereof, for example ε-caprolactone or dilactide, or a mixture or a copolymer of F) and G), and H) a carbonate constituent which has been produced from aromatic bifunctional phenols, preferably bisphenol A, and carbonate donors, for example phosgene, wherein the content of esters F) and/or G) must be at least 70% by weight with respect to the sum of F), G) and H);

aliphatic or partially aromatic polyester amides comprising

I) an ester constituent formed from linear or aromatic alcohols, preferably $C_2$–$C_{12}$ alkyl diols such as ethanediol, butanediol or hexanediol for example, preferably butanediol, and/or from cycloaliphatic bifunctional or polycyclic aliphatic alcohols, such as cyclohexanedimethanol for example, and/or optionally from small amounts of branched bifunctional alcohols, preferably $C_3$–$C_{12}$ alkyl diols such as neopentyl glycol for example, and optionally from small amounts of alcohols of higher functionality in addition, preferably $C_3$–$C_{12}$ alkyl polyols, such as 1,2,3-propanetriol or trimethylolpropane for example, and from linear and/or cycloaliphatic bifunctional acids and optionally from small amounts of acids of higher functionality in addition, preferably those which contain 2 to 12 C atoms in their alkyl chain or those comprising phenyl or naphthyl rings, most preferably adipic acid, or K) acid- and alcohol-functionalised components, preferably components containing 2 to 12 C atoms in their alkyl chain, for example hydroxybutyric acid or hydroxyvaleric acid or lactic acid, or derivatives thereof, for example ε-caprolactone or dilactide, or a mixture or a copolymer of I) and K), and L) an amide constituent formed from linear and/or cycloaliphatic bifunctional amines and/or optionally from small amounts of branched bifunctional amines, which preferably contain 1 to 12 C atoms in their alkyl chain, or from $C_5$ or $C_6$ cycloaliphatic bifunctional amines and optionally from small amounts of amines of higher functionality in addition, wherein the amines are most preferably isophoronediamine and are most preferably hexamethylenediamine, and from linear and/or cycloaliphatic bifunctional acids and/or optionally from small amounts of branched bifunctional acids and optionally from small amounts of acids of higher functionality in addition, preferably those containing 2 to 12 C atoms in their alkyl chain, most preferably adipic acid, or M) comprising an amide constituent formed from acid- and amine-functionalised cycloaliphatic components, preferably those containing 4 to 20 C atoms in their cycloaliphatic chain, preferably ω-laurolactam and most preferably ε-caprolactam, or a mixture of L) and M) as the amide constituent.

The content of esters A) and/or B) must be at least 30% by weight with respect to the sum of I), K), L) and M).

All the biologically and enzymatically degradable polyester urethanes, polyesters, polyester carbonates and polyester amides have a molecular weight of at least 10,000 g/mole and generally comprise a random distribution of the starting materials in the polymer. In a polymer synthesis which is typical of polyurethanes which optionally comprise C) and D) as well as E), a completely random distribution of the monomer components cannot always be expected. All the biodegradable polyester urethanes, polyesters, polyester carbonates and polyester amides, preferably polyester urethanes, may be present in bulk or as a solution or dispersion, preferably as a dispersion in water.

The completely biologically and enzymatically degradable polyester urethanes, polyesters, polyester carbonates and polyester amides according to the invention can be provided with fillers and reinforcing agents and with auxiliary processing aid materials, such as nucleating agents, demoulding agents or stabilisers for example, wherein it should be ensured that their capacity for complete biological and enzymatic degradation is not impaired or that the residual substances are harmless in the sense of further treatment (e.g. sewage purification).

The fillers and reinforcing agents which are suitable according to the invention can be minerals such as kaolin, chalk, gypsum, limestone or french chalk for example, or natural substances such as starch or modified starch, cellulose or cellulose derivatives or cellulose products, wood flour, or natural fibres such as hemp, flax, rape or ramie fibre for example.

The completely biologically and enzymatically degradable polyester urethanes, polyester carbonates and polyester amides according to the invention can be mixed with each other and can also be mixed with other blend constituents, wherein it should be ensured that their capacity for complete biological and enzymatic degradation is not impaired or that the residual substances are harmless in the sense of further treatment (e.g. sewage purification). Other polymers which are biodegradable or which are not biodegradable can be used as further blend constituents.

The lipase from *Candida antarctica* component B., the lipase from *Aspergillus niger* or the lipase from *Mucor Miehei* (e.g. Lipozyme 20,000 L, Novo Nordisk A/S, Denmark) or a mixture thereof is used for enzymatic degradation. These enzymes can also be mixed with each other or with other enzymes.

The ratio in which enzymes are used in combination is determined by the activity thereof in relation to the polymer or in relation to the degradation products thereof. The enzymes can be used in an activity ratio of 5:95 to 95:5; this ratio is preferably 20:80 to 80:20 and is most preferably 40:60 or 60:40. The activity is determined by titration for example, via the release of acid groups during the enzymatic polymer degradation. Other lipolytic and/or proteolytic enzymes can be used.

Metal ions, such as sodium or calcium ions for example, can also be added. Anionic or nonionic surfactants, such as secondary alcohol ethoxylates for example, can also be added.

Lipase (B) from the Candida antarctica strain, component B, which can be used according to the invention, is described in WO 88/02775.

The lipase Lipozyme 20,000 L is a commercial product supplied by Novo Nordisk, Denmark.

The lipase from the *Aspergillus niger* strain is commercially available, for example from the Fluka company of Buchs, Liechtenstein.

Lipases, cutinases, esterases, phospholipases and lysophospholipases are designated as lipolytic enzymes in the sense of this invention. These lipolytic enzymes preferably originate from microorganisms. They originate in particular from bacteria, fungi or yeasts. In one particularly preferred embodiment, the lipolytic enzymes originate from Absidia, particularly *Absidia blakesleena* and *Absidia corymbifera*, Aspergillus, particularly *Aspergillus niger* and *Aspergillus flavus*, Achromobacter, particularly *Achromobacter iophagus*, Aureobasidium, particularly *Aureobasidium pullulans*, Bacillus, particularly *Bacillus pumilus* and *Bacillus stearothermophilus*, Brochotrix, particularly *Brochotrix thermosophata*, Candida, particularly *Candida cylindracea* (*Candida rugosa*), *Candida paralypolitica* and *Candida antarctica*, Chromobacter, particularly *Chromobacter viscosum*, Coprinus, particularly *Coprinus cinerius*; Fusarium, particularly *Fusarium oxysporum* and *Fusarium solani*, Geotricum particularly *Geotricum penicillatum*, Hansenula particularly *Hansenula anomala*, Humicola, particularly *Humicola brevispora, Humicola brevis* var. *thermoidea* and *Humicola insolens*, Hyphozyma, Lactobacillus, particularly *Lactobacillus curvatus*, Penicillium, particularly *Penicillium cyclopium, Penicillium crustosum* and *Penicillium expansum*, Pseudomonas, particularly *Pseudomonas aeruginosa, Pseudomonas cepacia, Pseudomonas fluorescens, Pseudomonas fragi, Pseudomonas mephitica, Pseudomonas alcaligenes, Pseudomonas plantari, Pseudomonas pseudoalcaligenes, Pseudomonas putida, Pseudomonas mendocina* or *Pseudomonas stutzeri*, Rhizomucor, particularly *Rhizomucor miehei*, Rhizopus, particularly *Rhizopus japonius, Rhizopus microsporus, Rhizopus delemar, Rhizopus niveus, Rhizopus arhizus* and *Rhizopus nodosus*, Rhodotorula, particularly *Rhodotorula glutinis*, Sporobolomyces, particularly *Sporobolomyces shibatanus*, Thermomyces, particularly *Thermomyces lanuginosus* (formerly *Humicola lanuginosa*), Thiarosporella, particularly *Thiarosporella phaseolina* and/or Trichoderma, particularly *Trichoderma harzanium* and *Trichodenna reesei*. The lipolytic enzymes may also be of vegetable or animal origin.

In one particularly preferred embodiment, lipolytic enzymes according to this invention originate from a strain of *Candida cylindracea*, from a strain of *Candida antarctica*, particularly Lipase B from *Candida antarctica* (WO 88/02775), from a strain of *Pseudomonas cepacia*, a strain of Hyphozyma, from a strain of *Aspergillus niger* and/or from a strain of *Mucor mihei*.

In another preferred embodiment, the lipolytic enzyme is an esterase which originates from a strain of Rhodosporidium, particularly *Rhodosporidium toruloides* or from a strain of Pseudomonas, particularly *Pseudomonas aerigunosa, Pseudomonas pseudoalcaligenes, Pseudomonasfluorescens, Pseudomonas putida* and *Pseudomonas maltophilia*.

The proteases preferably originate from bacteria of the Bacillus genus. Proteases from the organisms *Bacillus alcalophilus* and *Bacillus licheniformis* are most preferred.

Suitable microorganisms for the production of enzymes which are suitable according to the invention, such as Candida antarctica for example, can be isolated by the customary methods of microbiology, e.g. by cultivation on customary nutrient media and testing for lipase activity. The enzymes are also isolated and purified by customary methods (see WO 88/2775 for example).

The aqueous solution which is required for carrying out the method according to the invention can be buffered. The pH is generally between 2 and 12, preferably between 5 and 9 and most preferably between 6 and 8. The temperature at which enzymatic degradation is carried out is generally between 5 and 95° C.; it is preferably between 20 and 70° C. and most preferably between 30 and 50° C. Alcohol/water mixtures can also be used as solvents.

The following are examples of buffers which can be used according to the invention: citrate, acetate, phosphate, formate, carbonate, tris-hydroxymethylaminomethate, triethanolamine, imidazole, oxalate, tartrate, fumarate, maleate, phthalate, succinate and ethylenediamine, as well as a plurality thereof. Acetates, phosphates and citrates are preferably used as buffers.

The method can be carried out in various ways:

The polymer is added to the aqueous solution which contains enzymes. The biodegradable polymer can be added as a film, sheet or as a granular material. Mouldings can be added as an integral whole or in comminuted form. Coated or adhesively bonded materials, or materials on which coatings of biodegradable polymers have been deposited, such as paper or cardboard as well as coated paper or coated cardboard for example, can be added whole or in comminuted form to the enzyme-containing solution.

The aqueous, enzyme-containing solution can also be sprayed or deposited by spraying on to the coating to be degraded or on to the moulding to be degraded.

The method described above for the enzymatic degradation of biologically and enzymatically degradable polymers (=BAEDPs) and of blends produced therefrom can be used according to the invention, for example, for:

The incorporation of chemicals, active ingredients, hormones, adjuvant substances, enzymes, microorganisms or plant seeds in BAEDPs (e.g. capsules and microcapsules) and for the targeted release thereof by the addition of enzymes.

The use of BAEDPs as adhesives or binders for the production of composite materials, with the aim of decomposing the latter again by means of enzymes.

The use of BAEDPs for the production of polymeric composites such as wooden composites for shuttering (e.g. building shuttering), with the aim of decomposing the latter by the addition of enzymes or of speeding up the separation thereof.

The use of BAEDPs for the coating, adhesive bonding or sizing of cardboard or paper, with the aim of enzymatically degrading and removing BAEDPs. In particular, this application comprises the recycling of coated and/or sized paper, laminated films or blister packs. This also includes blends of BAEDPs and non-degradable polymers, which become detachable or decomposable due to the enzyme treatment. This further comprises the coating of cardboard or paper with BAEDPs, with the aim of removing difficultly separable printing inks (e.g. those which can be crosslinked by UV) by means of enzymes in a de-inking process.

The use of BAEDPs for the adhesive bonding or coating of cardboard or paper with other plastics, lacquers or metallic materials, particularly aluminium, with the aim of decomposing the BAEDPs enzymatically and thus of removing the other plastics, lacquers or metals, in order optionally to recycle them. Amongst others, the following plastics or lacquers are in accordance with the invention: polyesters, polyamides, polyurethanes, polyolefines, particularly polyethylene and polypropylene, polyacrylates, elastomers such as rubber and derivatives thereof, polyvinyl alcohol, polyvinyl acetate, cellulose esters, styrene-butadiene polymers which contain acrylonitrile, and melamine resins. In particular, this comprises the recycling of coated paper, laminated films or blister packs.

The use of BAEDPs as binders for the application of microcapsules to carbonless typing paper, with the aim of selectively removing the binder by enzymes in order to recycle the paper.

The use of mouldings, sheet-like products, adhesively bonded products, coatings or foams made of BAEDPs, with the aim of degrading these products by pretreating them with enzymes. In particular, this comprises liquefaction, with the aim of disposing of the BAEDPs as waste via a sewage works after use, or of reducing the volume of waste.

The production of mouldings, sheet-like products, foams or coatings which can deliberately be made porous by the addition of suitable enzymes.

The production of fibres, woven fabrics or textiles made of BAEDPs, which can be decomposed, or the volume of which can be reduced, by the use of enzymes.

The use of enzymes for the degradation of BAEDPs, with the aim of producing aqueous dispersions therefrom.

The selective removal of coatings, claddings, coverings or lacquers made of BAEDPs by means of enzymes.

The production of oligomers of BAEDPs by means of enzymes.

The production of sheet-like products, mouldings, foams or coatings, which can contain chemicals, active ingredients, adjuvant substances, enzymes, microorganisms or plant seeds, in order to distribute and then to release the latter by enzymatic degradation.

The production of packaging materials made of BAEDPs of any type, with the aim of treating the packaged product and of releasing it again after treatment by the addition of enzymes. This relates in particular to the packaging of washing and the enzymatic decomposition of the packaging in a washing process. This further relates in particular to the collection of left-over food or other materials in films made of BAEDPs, with the aim of sterilising the latter, storing them under sterile conditions and then releasing the contents again by the addition of enzymes.

The decomposition of hygiene bags (ostomy bags) for artificial intestinal outlets by means of enzymes.

The use of BAEDPs for the production of printing inks, with the aim of producing an ink, which can be enzymatically decomposed and/or removed, for an enzymatic de-inking process.

The use of BAEDPs for the packaging of active ingredients or toxic compounds, particularly plant protection agents, with the aim of producing enzymatically decomposable packaging or an enzymatically decomposable inlay which facilitates pollutant-free recycling of the surrounding packaging.

The use of BAEDPs for the collection of waste products, particularly faeces, with the aim of decomposing the packaging after collection by means of enzymes in order to release and/or to dispose of the packed material.

The use of BAEDPs in combination with other materials (e.g. metals or non-degradable plastics) or as coatings thereon, with the aim of enzymatically degrading the BAEDPs after use in order to recover the other materials. This applies in particular to the recycling of electronic components.

The use of a combination of BAEDPs and enzymes, with the aim of treating the BAEDPs with enzymes in order to speed up the biodegradability thereof in a composting process or in an aerobic treatment process.

EXAMPLES

The enzymes cited in the Examples were added as a solid or as a liquid solution of enzymes. The activities which were added are given by the following data:

1. Lipozyme 20,000 L (lipase from Mucor Mihei) is a commercial product supplied by Novo Nordisk. The activity of the enzyme solution was guaranteed by the manufacturer, and was 20,000 lipase units/g. A unit is defined as the amount of enzyme which releases one μmole butyrate per minute from tributyrin at 30° C. and pH 7.0. The method of determining the activity can be obtained from the manufacturer under the designation "AF 95".
2. Lipase component B from Candida antarctica was an enzyme solution, the activity of which is 16,000 LU/ml. An experimental product supplied by Novo Nordisk was used. The activity was again defined as the release of butyrate from tributyrin. The method of determining the activity can be obtained from Novo Nordisk under the designation "AF 95/5".
3. The lipase from Aspergillus niger was a commercial product supplied by Fluka. The quoted activity was 1 U/mg. The activity is defined as the amount of enzyme which releases 1 μmole oleic acid per minute from triolein (also supplied by Fluka) at pH 8 and 40° C.

Example 1

Small pieces of a blown film with a thickness of 50 μm, made from a polyester amide comprising 60% by weight caprolactam and 40% by weight of an ester of adipic acid and butanediol which was produced by random condensation polymerisation and which had a relative solution viscosity of 2.5 as measured in a 1% by weight solution in meta-cresol at 20° C., were each placed in 10 ml of 100 mM potassium phosphate buffer at pH 7.0.

The given amount of enzyme was subsequently added in solid form. Incubation was effected for several hours.

TABLE 1

Degradation of polyester amide

|  | Enzyme | Amount used | Degradation |
|---|---|---|---|
| Example 1 | Lipase from Candida antarctica, component B | 3 mg | ++ |
| Control | Distilled water |  | — |
| Control | Buffer |  | — |

− no degradation, film intact
+− scarcely any degradation, film almost complete
+ degradation incomplete, film had disintegrated into numerous pieces
++ complete degradation, film completely decomposed The above example shows that complete degradation was achieved within the timescale of the test by the lipase from Candida antarctica, component B. The control experiments verified that the addition of water and buffer did not degrade the polymer, or only degraded the polymer incompletely.

Example 2

Injection-molded parts and blown films of different thicknesses made of polyester amide with the same composition as in Example 1 were incubated at 37° C. with agitation (200 rpm) in 200 ml of a 50 mM KP buffer at pH 7.5 (0.02% Na azide). 50 mg of solid granular enzyme material comprising lipase component B from Candida antarctica were added. During the incubation of the samples, the pH was kept constant by adding KOH. Complete degradation of the samples was determined by visual examination.

TABLE 2

Degradation of mouldings by enzymes

| Batch No. | Thickness of sample | Days required for complete degradation | Initial weight of polymer [g] |
|---|---|---|---|
| 1 | blown film, 50 μm | 0.21 | 0.35 |
| 2 | 0.9 mm | 3.9 | 1.4 |
| 3 | 1.7 mm | 6.6 | 1.7 |
| 4 | 4 mm | 14 | 1.5 |
| 5 | 6 mm | 22 | 1.8 |

Example 3

Typing paper was coated with a blown film of polyester amide with the same composition as in Example 1. The coated paper was beaten into small pieces in a mixer and was transferred to a solution buffered with 50 mM KP buffer at pH 7.0 (0.02% azide). The consistency was adjusted to 3%. 0.5% (v/v) of an enzyme solution which contained the lipase component B from Candida antarctica was added to this solution. Samples were taken from the mixture at regular intervals, and the content of adipic acid of the samples was measured. Adipic acid was contained as a monomer component in the polymer tested.

It had been found in a preliminary test that a blown film comparable with this coating had been completely degraded when the content of adipic acid in the liquid exceeded 6 mmoles/l. The complete degradation of the paper coating could therefore be followed via the release of adipic acid.

The coating was completely decomposed within 2 hours. No degradation of the coating was observed in a comparative batch without enzyme.

Example 4

300 mg of granules of a polyester urethane which contained urea groups (Degranil® DLN, a commercial product supplied by BAYER AG) were added to 50 ml of a potassium phosphate buffer (200 mM, pH 6.95, 0.02% sodium azide). The given amounts of different enzymes were subsequently added. The amounts used are given in Table 3. The final concentration in the batch is given in each case. The final concentration of liquid enzymes was 1% (v/v). For solid enzymes, 0.1% (w/v) was added. Samples were taken from the batches after 20, 51, 164 and 358 hours, and the pH and adipic acid content of the samples were determined. Adipic acid was one of the monomers from which the polymer investigated was synthesised. At the end of the incubation, the content of undegraded polymer was determined. For this purpose, the entire batch was passed through a folded filter and the increase in weight of the batch was determined after drying. The degree of degradation was determined via the difference in weight compared with the original amount. The results are summarised in Table 3.

TABLE 3

Degradation of the polyester urethane Degranil ® DLN,
which contains urea groups, by enzymes
Residual polymer after the completion of incubation

| | Enzyme | Amount of residual polymer in % |
|---|---|---|
| Comparison | None | 101.6 |
| Example 4-1 | 1% Lipozyme 20,000 L v/v | 8.6 |
| Example 4-2 | 1% Lip. *C. antarctica* comp. B v/v | 4 |
| Example 4-3 | 0.1% Lip. *A. niger* w/v | 27.9 |

Degranil ® DLN is a commercial product supplied by Bayer
Lipozyme 20,000 L is a commercial product supplied by Novo Nordisk.

The aforementioned 3 enzymes were capable of degrading the polymer tested to an appreciable extent. The lipase from *C. antarctica* comp. B. degraded the polymer particularly rapidly. At the time when the first sample was taken, the content of adipic acid was already higher than 13 mg/ml. For the other batches, the amount of adipic acid released did not reach a maximum until the end of incubation.

Example 5
Enzymatic Degradation of Polyester Urethanes

Fine granules of Bionolle 1010 and 3030 sere used as the test material. Bionolle 1010 and 3030 are commercial products supplied by Showa Denko. They are polyester urethanes in which polyesters are lengthened with small amounts of diisocyanate.

300 mg of fine granules of the polymer were added to 100 ml of potassium phosphate buffer (100 mM, pH 7, 0.02% Na azide). Lipolytic enzymes were subsequently added in the given amounts.

The amounts used are given in the Table. The final concentration in the batch is given in each case. The final concentration of liquid enzymes was 1% (v/v). For solid enzymes, 0.1% (w/v) was added. At the end of the incubation, the content of undegraded polymer was determined. For this purpose, the entire batch was passed through a folded filter and the increase in weight of the batch was determined after drying. The degree of degradation was determined via the difference in weight compared with the original amount.

The batches which contained Bionolle 1010 were terminated after 5 days.

In the main, the batches which contained Bionolle 3030 were terminated after 2 days. The batches which contained Bionolle 3030 and which contained the enzymes Lipozyme and the lipase from *Aspergillus niger* were terminated after 3 days.

The results are summarised in Table 4.

TABLE 4

Degradation of polyesters lengthened by diisocyanates
(polyester urethanes) enzymes
Residual polymer after the completion of incubation

| | Enzyme | Bionolle 3030 % of initial amount | Bionolle 1010 % of initial amount |
|---|---|---|---|
| Control | None | 102 | |
| Example 5-1 | 1% Lipozyme 20,000 L | 46 | |
| Example 5-2 | 1% Lipase *Cand. antarctica* component B | 28 | |

TABLE 4-continued

Degradation of polyesters lengthened by diisocyanates
(polyester urethanes) enzymes
Residual polymer after the completion of incubation

| | Enzyme | Bionolle 3030 % of initial amount | Bionolle 1010 % of initial amount |
|---|---|---|---|
| Example 5-3 | 0.1% lip. from *Aspergillus niger* | 53 | |
| Control | None | | 99 |
| Example 5-4 | 1% Lipase *Cand. antarctica* component B | | 33 |

Lipozyme 20,000 L is the trade name of a lipase supplied by Novo Nordisk.

Example 6
Enzymatic Degradation of Polylactide

Fine granules of polylactide (=PLA) were used as the test material. The tests were performed as described in Example 4.

After 2 days, the content of undegraded polymer was determined.

The results are summarised in the Table.

TABLE 5

Degradation of polylactide by enzymes
Residual polymer after the completion of incubation

| | Enzyme | % of initial amount |
|---|---|---|
| Control | None | 100 |
| Example 6-1 | 1% Lipozyme 20,000 L | 11 |
| Example 6-2 | 0.1% lip. from *Aspergillus niger* | 28 |

Example 7
Enzymatic Degradation of a Copolyester

The test material used consisted of fine granules of a polyester, which was produced by condensation polymerisation, after customary esterification, from 2797 g dimethyl terephthalate, 4217 g 1,4-butanediol, 3157 g adipic acid and 3.1 g titanium tetraisopropylate/triphenylphosphate (1:1). The tests were performed as described in Example 4.

The content of undegraded polymer was determined after 5 days.

The results are summarised in the Table.

TABLE 6

Degradation of a copolyester by enzymes
Residual polymer after the completion of incubation

| | Enzyme | % of initial amount |
|---|---|---|
| Control | None | 100 |
| Example | 1% lipase *Cand. antarctica* component B | 55 |

Example 8
Enzymatic Removal of a Polyester Amide Coating and a Polyethylene Coating on Paper Samples of paper which were coated with a biodegradable polyester amide (see Example 1) or to which a polyethylene film was adhesively bonded were subjected to enzymatic treatment. A biodegradable polyester was used for adhesively bonding the polyethylene to the paper.

Pieces of coated paper were cut out, each of which measured 5×5 cm, and were incubated in a closed 250 ml Erlenmeyer flask in 120 ml of 0.1 M dipotassium hydrogen phosphate buffer solution (pH 6.5) at 37° C. whilst being vigorously agitated (220 rpm). The buffer solution contained 0.5% v/v lipase from *Candida antarctica* comp. B and 0.02% w/v Na azide.

After an incubation period of a few hours, the biodegradable polyester amide coating was loosened from the paper underneath. This could be identified by the slight turbidity of the buffer solution.

After 36 hours, the polyethylene film which was adhesively bonded to the paper by the biodegradable polyester had separated from the paper. Two separate layers of polyethylene and paper remained floating in the solution. For smaller pieces of paper which were coated in exactly the same manner, detachment occurred considerably more rapidly.

The enzymatic degradation products of the polyester amide were detected in the buffer solution by HPLC analysis.

The buffer solution of the control batch, which contained no enzyme, was still clear when the test was terminated after 36 hours and contained no degradation products of the polyester amide.

Example 9

Adhesive Bonding of Paper with a Biodegradable Polyester Amide and Subsequent Enzymatic Separation of the Layers of Paper.

Sheets of paper could be stuck together with a biodegradable polyester amide and could subsequently be separated from each other again by the lipase from *Candida antarctica*, component B For this purpose, two pieces of paper measuring about 2×2 cm, between which a piece of identical size of a film of a biodegradable polyester amide (see Example 1) was placed, were adhesively bonded to each other on a hot plate at about 140° C. The top layer of paper was weighted by placing a metal plate on it during the adhesive bonding process. After about 2 minutes the two sheets of paper were firmly adhesively bonded to each other.

In order to separate the layers of paper, the adhesively bonded sheets of paper were placed in a Petri dish which contained 30 ml of 0.1 M dipotassium hydrogen phosphate buffer solution (pH 6.5) comprising 2% v/v lipase from *Candida antarctica* comp. B and 0.02% w/v Na azide. The batches were incubated at 37° C. with slight agitation.

After 4 hours the sheets of paper had separated from each other. In the control sample, which contained no enzyme, the two sheets of paper remained unchanged and adhesively bonded to each other.

In a similar manner, sheets of paper were also coated on one side with a biodegradable polyester amide. Incubation of these sheets of paper under the same conditions resulted in the detachment of the polyester amide layer in three hours. This was detected via the increase in turbidity.

When a coloured film is used, degradation can also be detected via the disappearance of the colour.

What is claimed is:

1. A method for the enzymatic degradation of biodegradable polymers wherein a biodegradable polymer is treated with an aqueous solution, optionally buffered, containing one or more members selected from the group consisting of the lipase from *Candida antarctica* and a cutinase.

2. The method of claim 1 wherein the cutinase is from *Humicola insolens*.

3. A method according to claim 1 wherein solution is a mixture of alcohol and water.

4. A method according to claim 1 wherein the pH of the solution is between 2 and 12.

5. A method according to claim 1, wherein the polymer exists as a film, sheet, a granular material or as a coating, as an integral whole or in comminuted form.

6. A method according to claim 1, wherein aliphatic or partially aromatic polyesters, thermoplastic aliphatic or partially aromatic polyester urethanes which may also contain urea groups, aliphatic-aromatic polyester carbonates and/or aliphatic or partially aromatic polyester amides are used as the biodegradable polymers.

7. A method according to claim 6, wherein the following are used as polymers:

aliphatic or partially aromatic polyesters formed from
- A) linear bifunctional alcohols and optionally from cycloaliphatic bifunctional alcohols and optionally from branched bifunctional alcohols and optionally from alcohols of higher functionality in addition, and from aliphatic bifunctional acids and/or optionally from aromatic bifunctional acids and acids of higher functionality in addition, or
- B) acid- and alcohol-functionalised components or derivatives thereof or comprising a mixture or a copolymer of A and B, wherein the content of aromatic acids is not more than 50% by weight with respect to all the acids, and the acids can also be used in the form of derivatives;

aliphatic or partially aromatic polyester urethanes, which may also contain urea groups, comprising
- C) an ester constituent formed from bifunctional alcohols and/or from cycloaliphatic bifunctional or polycyclic aliphatic alcohols and/or optionally from small amounts of branched bifunctional alcohols and optionally from small amounts of alcohols of higher functionality in addition, and from aliphatic bifunctional acids and/or optionally from aromatic bifunctional acids and optionally from small amounts of acids of higher functionality in addition, or
- D) acid- and alcohol-functionalised components or derivatives thereof, or comprising a mixture or a copolymer of C and D, and
- E) the reaction product of C and/or D with aliphatic and/or cycloaliphatic bifunctional isocyanates and optionally with isocyanates of higher functionality in addition, and optionally additionally with linear and/or branched and/or cycloaliphatic bifunctional alcohols and/or with such alcohols of higher functionality in addition, and/or optionally in addition with linear and/or branched and/or cycloaliphatic bifunctional dialkylamines or amino alcohols and/or alkylamines or amino alcohols of higher functionality and/or optionally with other modified amines or alcohols as the free acid or salt, wherein the content of esters C) and/or D) is at least 75% by weight with respect to the sum of C), D) and E);

aliphatic-aromatic polyester carbonates comprising
- F) an ester constituent formed from linear bifunctional alcohols and/or from cycloaliphatic bifunctional alcohols, and/or optionally from small amounts of branched bifunctional alcohols, and optionally from small amounts of alcohols of higher functionality in addition, and from linear and/or cycloaliphatic bifunctional acids and optionally from small amounts of acids of higher functionality in addition, or
- G) acid- and alcohol-functionalised components or derivatives thereof, or comprising a mixture or a copolymer of F) and G), and H) a carbonate constituent which is produced from aromatic bifunctional phenols and carbonate donors, wherein the content of esters F) and/or G) is at least 70% by weight with respect to the sum of F), G) and H);

aliphatic or partially aromatic polyester amides comprising

I) an ester constituent formed from linear or aromatic alcohols and/or from cycloaliphatic bifunctional alcohols and/or optionally from small amounts of branched bifunctional alcohols, and optionally from small amounts of alcohols of higher functionality in addition, and from linear and/or cycloaliphatic bifunctional acids and optionally from small amounts of acids of higher functionality in addition, or K) acid- and alcohol-functionalised components or derivatives thereof, or comprising a mixture or a copolymer of I) and K), and L) an amide constituent formed from linear and/or cycloaliphatic bifunctional amines and/or optionally from small amounts of branched bifunctional amines and optionally from small amounts of amines of higher functionality in addition, and from linear and/or cycloaliphatic bifunctional acids and/or optionally from small amounts of branched bifunctional acids and optionally from small amounts of acids of higher functionality in addition, or M) an amide constituent formed from acid- and amine-functionalised cycloaliphatic components which preferably contain 4 to 20 C atoms in their cycloaliphatic chain, preferably ω-laurolactam and most preferably ε-caprolactam, or comprising a mixture of L) and M) as an amide constituent, wherein the content of esters A) and/or B) is at least 30% by weight with respect to the sum of I), K), L) and M).

* * * * *